Figure 15:
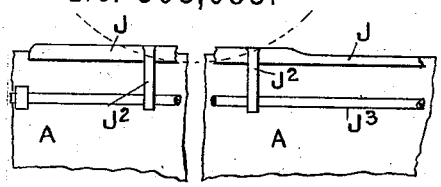

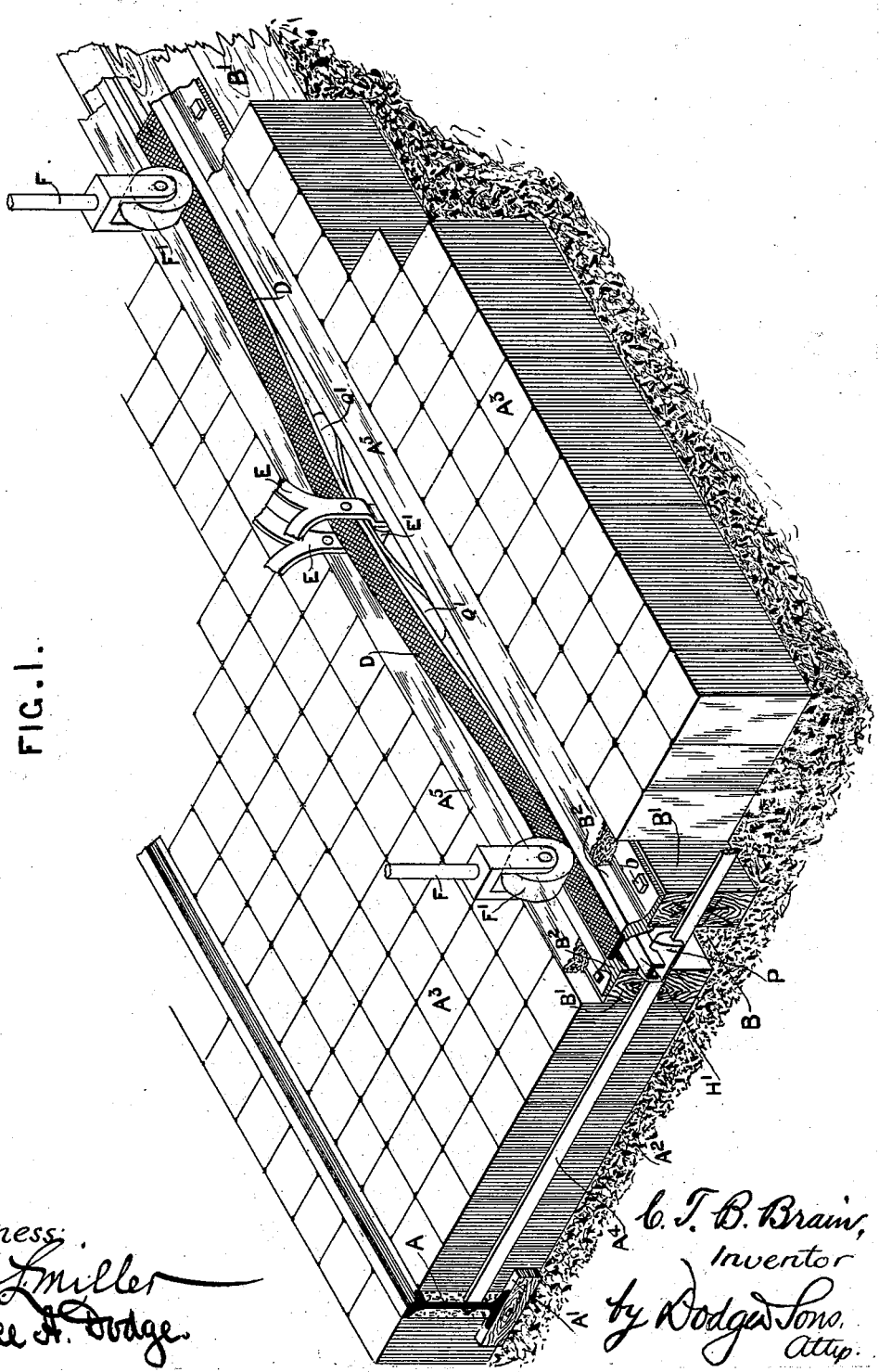

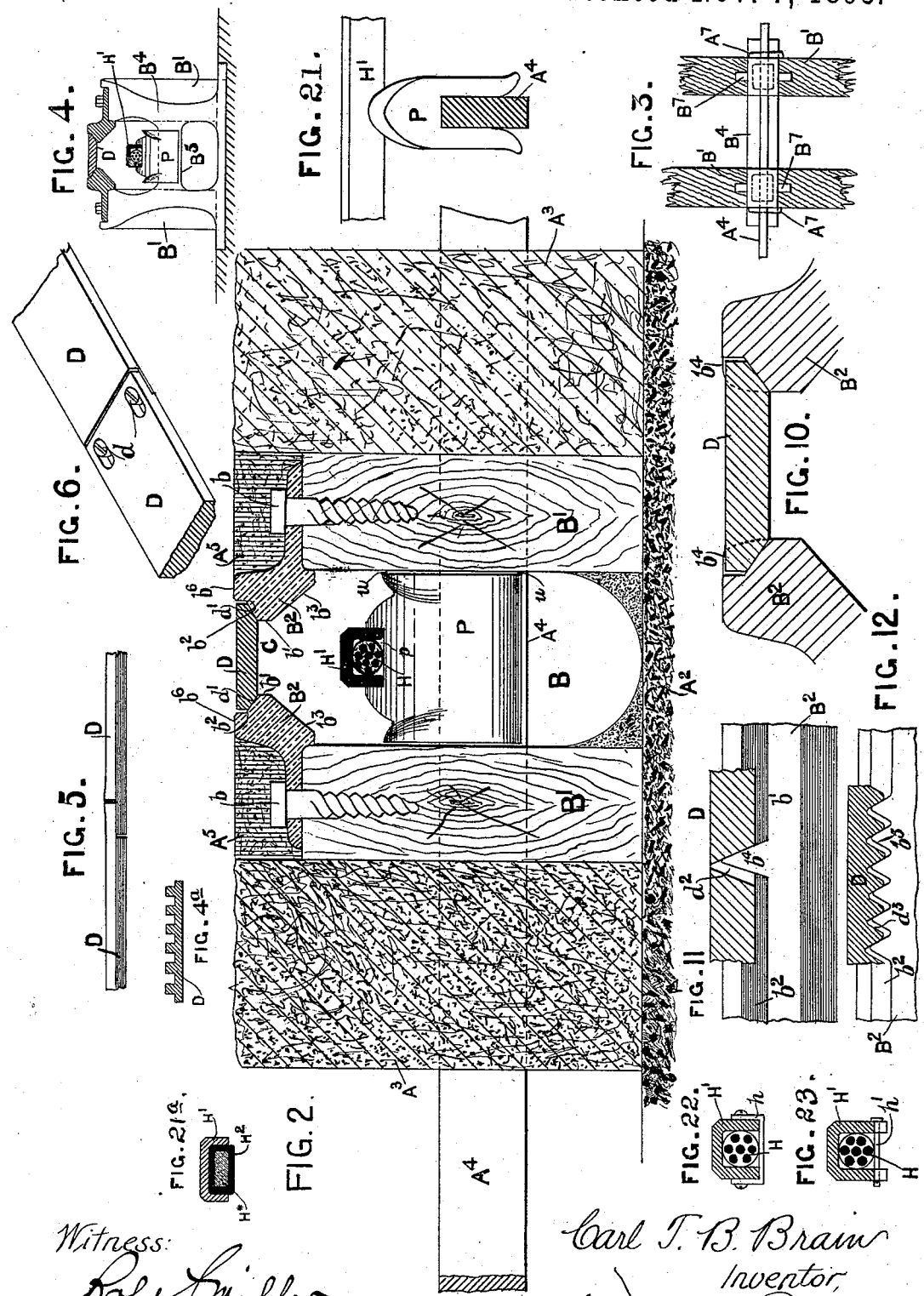

(No Model.) 5 Sheets—Sheet 3.
C. T. B. BRAIN.
ELECTRIC RAILWAY SYSTEM.
No. 508,083. Patented Nov. 7, 1893.
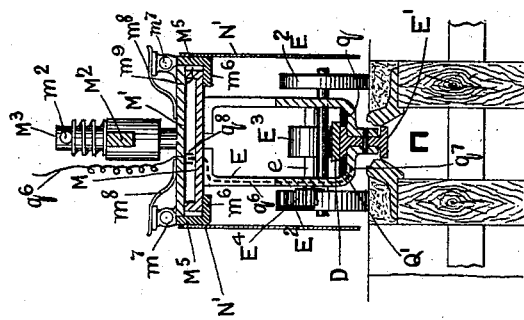
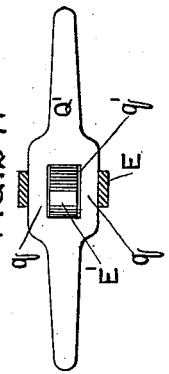
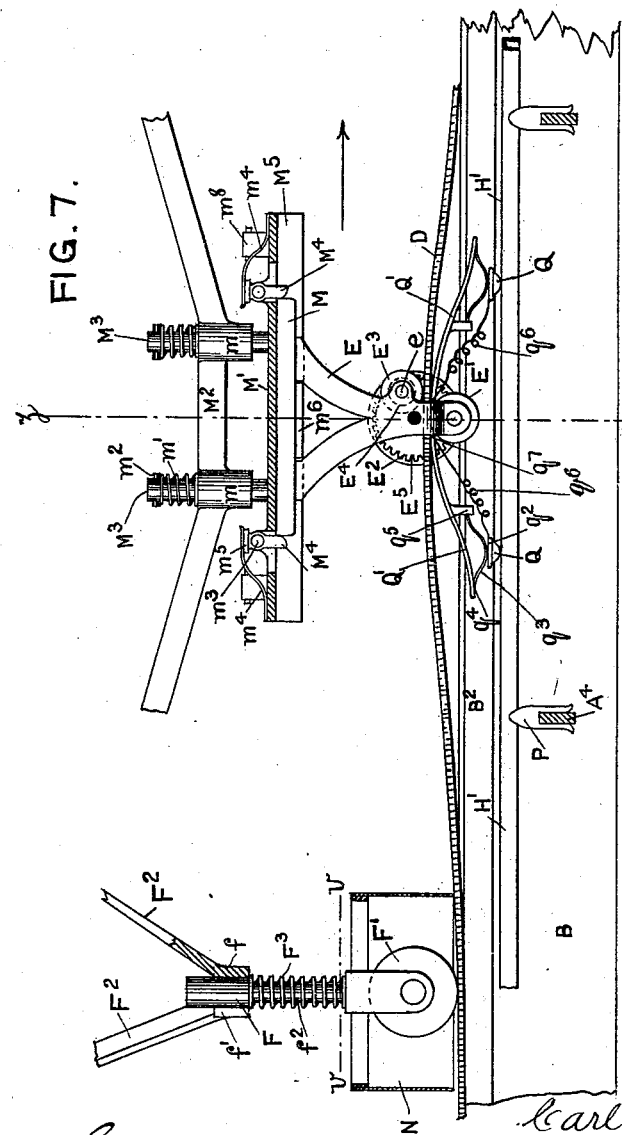
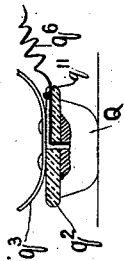
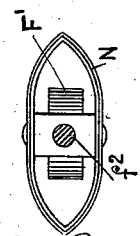
Witness:
Robt L Miller
Horace H. Dodge.
Carl T. B. Brain
Inventor
by Dodge Sons Attys (No Model.) 5 Sheets—Sheet 4.

C. T. B. BRAIN.
ELECTRIC RAILWAY SYSTEM.

No. 508,083. Patented Nov. 7, 1893.

Witness:
Robt L. Miller
Horace A. Dodge

Carl T. B. Brain
Inventor
by Dodge Sons, Attys.

(No Model.)  
5 Sheets—Sheet 5.

C. T. B. BRAIN.
ELECTRIC RAILWAY SYSTEM.

No. 508,083.  
Patented Nov. 7, 1893.

Witnesses:  
Horace A. Dodge  
Cell Bundine

Inventor:  
Carl T. B. Brain  
by Dodge Sons  
Attys.

UNITED STATES PATENT OFFICE.

CARL. T. BLANCH BRAIN, OF LIVERPOOL, ENGLAND.

ELECTRIC-RAILWAY SYSTEM.

SPECIFICATION forming part of Letters Patent No. 508,083, dated November 7, 1893.

Application filed August 29, 1891. Serial No. 404,134. (No model.) Patented in England September 4, 1890, No. 13,943; in France September 7, 1891, No. 215,958; in Germany September 18, 1891, Nos. 68,778, 69,191, and 69,264; in Belgium September 18, 1891, No. 96,436; in Italy September 30, 1891, XXV, 30,419, LX, 25; in Portugal October 28, 1891, No. 1,620; in Cape Colony November 7, 1891, No. 719; in Natal November 11, 1891; in Brazil November 19, 1891, No. 1,339; in Victoria November 19, 1891, No. 9,251; in South Australia November 20, 1891, No. 2,092; in Tasmania November 23, 1891, No. 1,003/10; in New South Wales November 23, 1891, No. 3,417; in Queensland November 23, 1891, No. 1,923; in New Zealand December 1, 1891, No. 5,313; in Austria-Hungary February 2, 1892, No. 100 and No. 61,147; in Spain March 5, 1892, No. 12,562; in Switzerland April 1, 1892, No. 4,743; in Norway April 7, 1892, No. 2,838; in Argentine Republic August 10, 1892, No. 1,189; in India September 26, 1892, No. 223, and in Canada October 6, 1892, No. 40,588.

*To all whom it may concern:*

Be it known that I, CARL. THOMAS BLANCH BRAIN, a subject of the Queen of Great Britain, residing at Liverpool, in the county of Lancaster, in the Kingdom of England, have invented certain new and useful Improvements in Electric Railways and Tramways, (for which I have received Letters Patent as follows: in Great Britain, No. 13,943, dated September 4, 1890; in Portugal, No. 1,620, dated October 28, 1891; in Brazil, No. 1,339, dated November 19, 1891; in France, No. 215,958, dated September 7, 1891; in Germany, Nos. 68,778, 69,191, and 69,264, dated September 18, 1891; in Spain and colonies, No. 12,562, dated March 5, 1892; in Belgium, No. 96,436, dated September 18, 1891; in Italy, XXV, 30,419, LX, 25, dated September 30, 1891; in Austria - Hungary, No. 100 and No. 61,147, dated February 2, 1892; in Argentine Republic, No. 1,189, dated August 10, 1892; in Cape Colony, No. 719, dated November 7, 1891; in Natal, dated November 11, 1891; in New Zealand, No. 5,313, dated December 1, 1891; in Victoria, No. 9,251, dated November 19, 1891; in Tasmania, No. 1,003/10, dated November 23, 1891; in New South Wales, No. 3,417, dated November 23, 1891; in South Australia, No. 2,092, dated November 20, 1891; in Queensland, No. 1,923, dated November 23, 1891, in Norway, No. 2,838, dated April 7, 1892; in Switzerland, (provisional,) No. 4,743, dated April 1, 1892; in Canada, No. 40,588, dated October 6, 1892, and in India, No. 223, dated September 26, 1892,) of which the following is a specification.

My invention relates to certain improvements in that class of railways or tramways in which the motive power is transmitted to the vehicle from a distance by means of a power conductor contained in a channel or conduit, lying in or near and parallel to the permanent way, and by a connecting device moving with the vehicle and projecting into said conduit to the conductor.

My invention is more especially applicable to railways in which the power conductors are electrical ones, but some parts of it may also be employed in connection with any kind of power conductor contained in a conduit as above described, whether cable, electric, pneumatic or hydraulic.

The invention has for its objects, first, the affording of facilities whereby a closed or sealed conduit may be employed in conjunction with a direct and more or less rigid connection from the vehicle to the power conductor in the conduit; second, the construction of such a conduit in a manner to allow a very wide opening into it, whereby a much larger and stronger connecting device may be employed than is permissible with an open slot conduit; third, improvements in the construction of the conduit for the above, giving increased strength with much reduced dimensions, whereby the conductor may be so near the road surface as to be fixed without interfering with the tie-rods of the permanent-way, and whereby the depth of the conduit is so reduced that the whole may be laid upon the road-bed or pitching; fourth, improvements in the arranging, mounting and insulating of the electrical conductors within the conduit, and in their construction; fifth, improvements in the method of connecting the conductors, thereby insuring continuity of current supply, and safety from accident; sixth, improvements whereby the interior of the conduit is rendered more accessible and whereby the whole may be more readily cleansed or repaired; seventh, improvements in the method of connecting the vehicles to the conductors, and of controlling them, whereby an economy is effected in the power required.

In carrying my invention into practical effect, I construct a conduit which is normally closed, but which, throughout its entire length, is capable of being opened by the passage of a vehicle and of closing automatically or by the action of the vehicle, after the passage of the same, the opening and closing being performed in such manner as to permit the connecting device (hereinafter called the "connector") which is attached more or less rigidly to the moving vehicle, to travel with ease and rapidity along the conduit. The conduit is furnished along its entire length on its upper side with a space or opening through which the vehicle connector projects in order to reach the power conductor within the conduit. I use a single continuous, flat, flexible cover rail or strip, placed on or near the surface of the roadway, over a wide opening built in the conduit, and the conductors are placed directly under it, the cover rail preventing dirt from falling upon them. The cover rail is supported at both edges by ledges and the rail and opening are made of such width that the conductors can be fixed near the under side of the cover rail passing above the rail tie-rods which are used to support them. The flexible cover strips, though sufficiently flexible in the required direction, are so constructed and arranged, when necessary, as to be capable of resisting any downward pressure which is likely to be put upon them by the passage of road traffic. The conductors are divided into sections along the line, each connected to a main conductor. The main conductor, and the sections of the divided or working conductor connected to it are both supported in the same position and by the same insulators, the working conductor being made to serve as a mechanical protector and cover for the main conductor over which it is laid. A safety cut out is in circuit with each section of the line, but arrangements, as hereinafter described, are made, whereby the continuity of current supply to the vehicles is insured even in case of accident to either of the working conductors. Such arrangements are also utilized as a means of economizing the power given off by a vehicle when descending an incline or being stopped.

The cover bar can be easily removed from the conduit and the opening then gives perfect access to its interior. There is, therefore, no necessity to make the side ironwork and ledges removable, and deep channel iron each side of the opening is not required. The cover bar is so shaped that the ledges can be strongly built though small, and their undersides are cut away, so that the conductors can be fixed nearer them, thus reducing the necessary depth of the conduit, whereby the road pitching need not be cut into or disturbed but used as a continuous support for the sides of the conduit.

The connector is attached to the vehicle in such manner as to be sufficiently rigid to plow open the conduit opening. Its attachment is, however, sufficiently flexible to enable it to accommodate itself to any irregularities in the conduit or in the movement of the vehicle. It is also attached to the vehicle in such manner that, should any abnormal pressure be brought to bear upon it, it will become detached and permit the vehicle to pass on without it. The connector may pass down one or both sides of the cover bar in order to reach the interior of the conduit, or it may pass between the bars when double lengths are used.

The electrical contacts for connector are two in number and have each a separate insulated cable, connected to the vehicle circuit. Safety cut outs are arranged in circuit with these, as hereinafter described, and also upon the connector within the conduit, whereby the risk of injury through accident is minimized.

Figure 14:
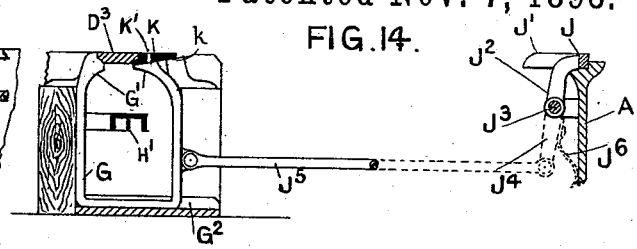
Figure 13:
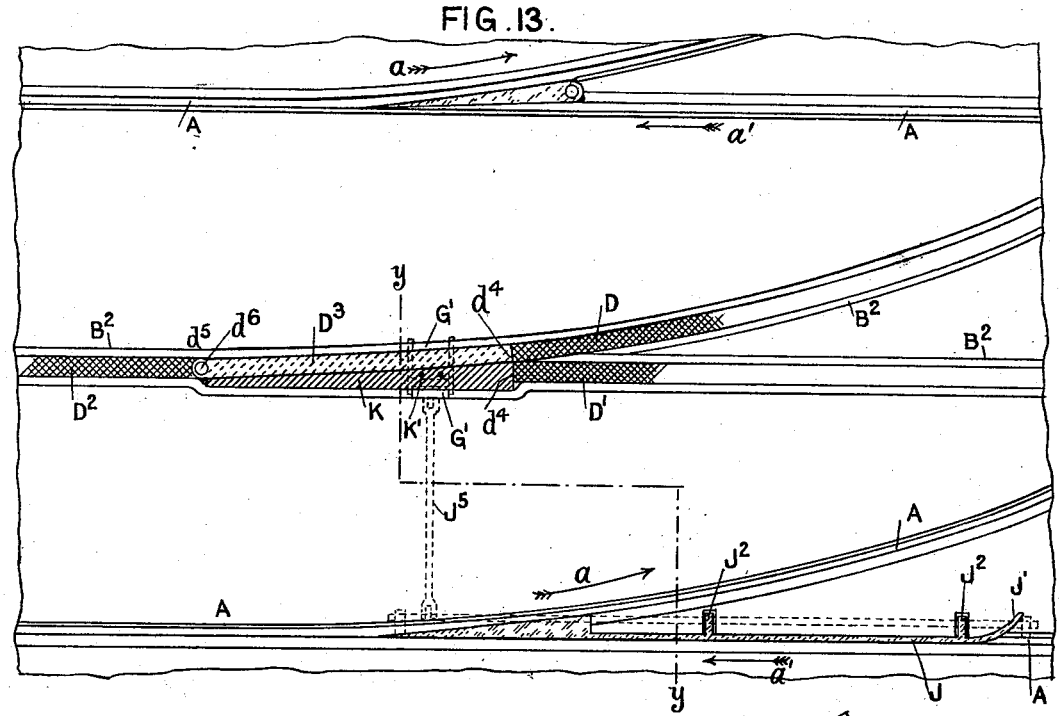
Figure 18:
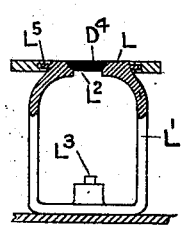
Figure 17:
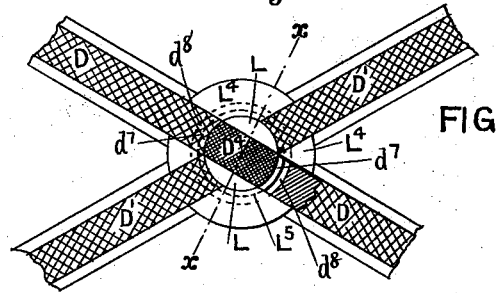
Figure 16:
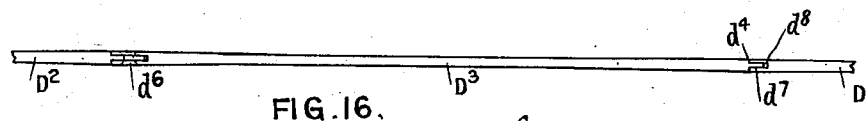
Figure 26:
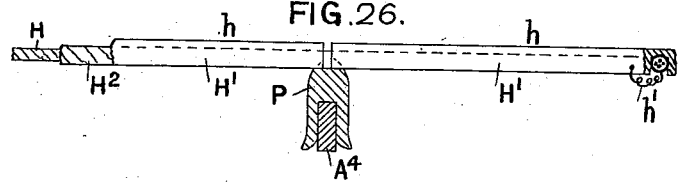
Figure 27:
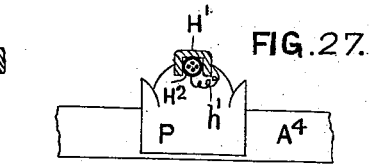
Figure 19:
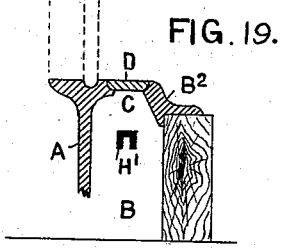
Figure 28:
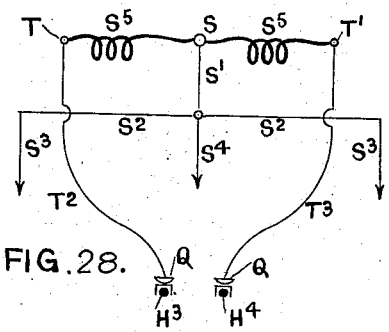
Figure 29:
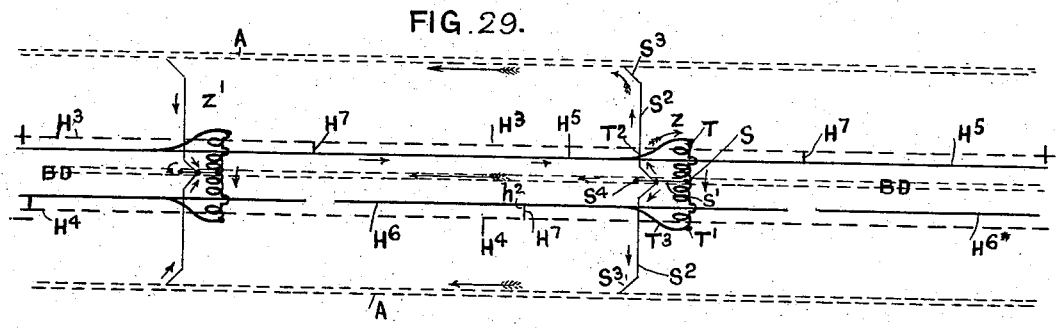
Figure 30:
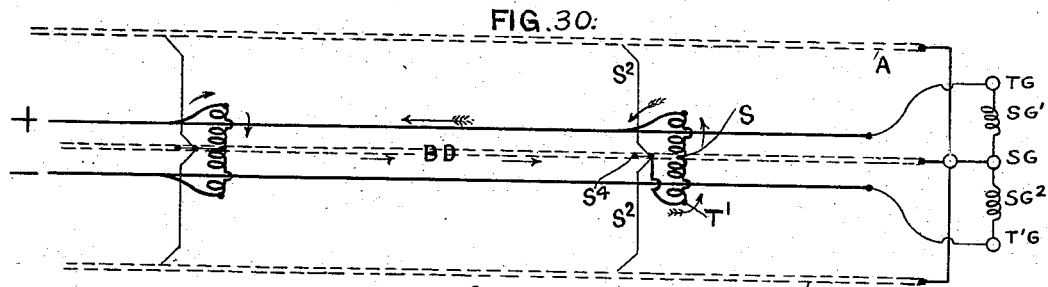
Figure 31:
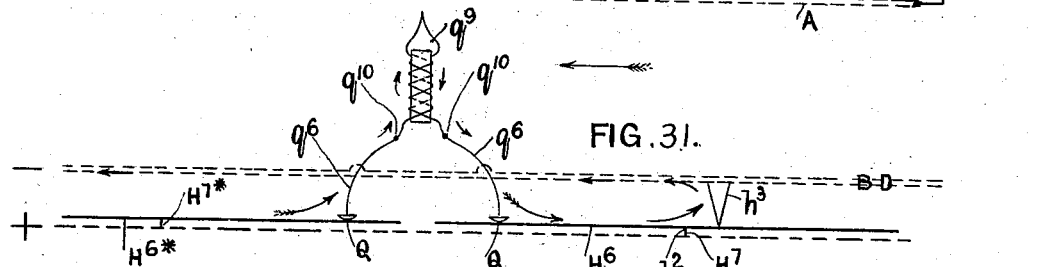

In the drawings:—Figure 1, is an isometric view of a portion of the conduit and track and of parts connected therewith. Fig. 2, is a transverse section of the conduit on a larger scale than Fig. 1. Figs. 3 and 4 are plan and transverse sections respectively showing a method of staying the conduit laterally. Fig. 4$^a$ shows a modified construction of flat bar or cover rail. Figs. 5 and 6 are respectively an edge view and an isometric view of the joint of the conduit flat bar or cover rail shown in Figs. 1 and 2. Fig. 7 is a sectional elevation through the central plane of the conduit, showing the connector and the various parts belonging thereto, and also one of the guiding devices for the flat bar or cover rail of the conduit. Fig. 8 is a transverse section on line $z\ z$, Fig. 7. Fig. 9 is a plan of part of the bearing for the guide stem shown in Fig. 7. Figs. 10 and 11 are respectively transverse and longitudinal sections, showing a device for preventing the flat bar or cover rail from "creeping," the said bar being shown raised slightly in the latter figure. Fig. 12 shows a modification of the preceding construction. Fig. 13 is a plan showing the construction and arrangement of flat cover bar at the junction of two conduits. Fig. 14 is a transverse section on an enlarged scale along the line $y\ y$, Fig. 13. Fig. 15 is a side view of part of the mechanism shown in Fig. 14. Fig. 16 is a detail of the junction flat cover bar hereinafter described. Fig. 17 is a plan showing the method of arranging and constructing the flat cover bars at the crossing of two conduits. Fig. 18 is a transverse section on line $x\ x$, Fig. 17. Fig. 19 is a transverse section of a modified form of conduit hereinafter described. Fig. 20, Sheet 3 is a section on $v\ v$, Fig. 7. Fig. 21, Sheet 2, is a section on line $u\ u$, Fig. 2. Fig. 21$^a$ is a transverse section of the form of conductor which I prefer to use. Figs. 22 and 23 show two methods of supporting the conductor at points intermediate to the insulators. Fig. 24, Sheet 3, is a plan of the saddle piece shown in Fig. 7. Fig. 25 is a part section (on an enlarged scale) of the connector contact and parts in immediate connection therewith. Figs. 26 and 27, Sheet 4, are a side elevation and a transverse section respectively of the arrangement of conductor. In the preceding figures, the conduit is shown with only a single electric power conductor in it. It must be understood, however, that I prefer to employ two conductors, as seen in the following three figures: Fig. 28 is a diagram illustrating the improved arrangement of connections between the working circuit of the vehicle, the earth circuit, and the main conductors. Figs. 29 and 30 are diagrams illustrating the manner in which the above improved connections may respectively be utilized to insure the continuity of the electric supply, in the event of a section of the conductor being cut out, and to assist in braking the vehicles. Fig. 31 is a diagram showing how the working sections of the conductor, the connector contacts and their electrical connections may be arranged to reduce the risk of damage to the remaining sections in the event of a fault in, or a cut-out of, one of the sections.

Referring first to Figs. 1 and 2:—A, is one of the track rails, mounted, in this case, upon longitudinal sleepers A', which are laid upon the road pitching A². A³ are the paving sets. A⁴ is one of the transverse tie-rods, connecting the track rails as usual. B is the power conduit, formed, in this instance, by the upper surface of the road pitching A²; two side timbers B' laid upon the same; two roof plates B² B² firmly secured to the timbers B', as by wood screws b and projecting over the conduit so as to form between their opposing edges the opening C, through which the connector, hereinafter described, projects, and a movable cover bar D, closing said opening and supported upon the plates B² B². The angles at the bottom of the conduit may be filled in with concrete fillets, as shown in Fig. 2. The upper surface of the cover bar D and the exposed portion of the plates B² lie on or near the road level and are roughened or serrated to make a good road surface. The spaces above the flanges of the plates B² are filled in with asphalt or concrete A⁵. The plates are preferably of steel, to secure great strength with little depth of section, and they may be held at a fixed distance apart by being firmly clamped or fastened to strong chairs B⁴, Fig. 4, which are placed at short intervals along the conduit and are strengthened by transverse webs or bars B⁵ passing through the conduit and placed at about the level of the tie-rods, for a purpose hereinafter described. By forming the chairs in this manner, I am enabled, without reducing their strength, to make them much shallower than usual, so that they may be placed directly upon the road pitching, the webs being at such a height above the bottom of the conduit as to leave sufficient space for cleansing the latter. The chairs may, if desired, be firmly secured to the tie-rods, as seen in Fig. 3; the tie-rods being passed through the chair, and the latter held in place thereon by the cotters A⁷. The side timbers B' may be secured to the chairs by tongues B⁷, cast with the chairs and fitting into grooves in the ends of the side timbers.

The cover bar D is a flat bar or rail of metal or hard, strong, inelastic substance running preferably in connected sections the entire length of the conduit, having such a width and thickness as to firmly bridge over the opening C; yet it has just such flexibility in a longitudinal direction that, when raised vertically one or two inches at any point, it bends by its own weight and flexibility on both sides of said point within a length of a few feet, as seen in Fig. 1, returning to its seat by its own weight. The upper surface of the cover bar may be deeply corrugated in a transverse direction, as seen in Fig. 4ª, whereby any desired lateral strength may be obtained with the required longitudinal flexibility.

The various sections of the flat bar or cover rail (when united) may be hinged together at their ends or otherwise connected in any convenient manner, but preferably in such a way that the joint cannot be bent back or down, and is therefore capable of transmitting the lifting strain, causing the rail to act more as a continuous bar, and when raised to be self-supporting or rigid at the joint. In order to afford a slight play or sliding movement the ends may be connected by half checking their ends into each other, as in Figs. 5 and 6, and passing one or more countersunk screws $d$ through said ends, the screws being readily unfastened by a proper tool when access to the conduit is desired.

A ledge $b'$, either continuous or interrupted, is formed on the two opposing sides of the plates B² for supporting the flat cover-bar D. The flat cover-bar may be of any convenient shape in cross section. It is, however, preferable to chamfer it off on the under side near the two edges, as at $d'$, and to fit these chamfered parts against correspondingly inclined faces $b^2$ on the ledges $b'$. This arrangement enables the dirt to fall away more readily from the ledges. It also enables the plates B² to be cut away on their under sides as at $b^3$ without materially weakening them, as the downward thrust of the cover bar takes place along a line within the metal, even when this is cut away. This arrangement also lessens any tendency which the supporting plates may have to tilt or collapse in a downward and inward direction when an abnormal pressure is put upon the cover bar from above. As the roof plates need not be removable, are so little overhanging the conduit sides, and can be supported all along their length, they are made to occupy a minimum vertical depth, heavy bulb rails or channel iron being thus unnecessary. This is an improvement yielding valuable advantages.

E, Figs. 1, 7 and 8, is the connector, which is mounted upon the vehicle as hereinafter described, and is, in this case, shown as applied to a single electric conductor only. Its lower end extends past one or both edges of the flat cover bar D (the cover-bar being raised from its seat at this point) and passes underneath the same, so that, as the vehicle travels along, it raises the bar from its supporting ledges and thus gives the connector free access to the conduit. A roller E' is mounted upon the lower end of the connector and bears against the under side of the cover bars. Bearing rollers $E^2$ $E^2$ may also be furnished on the sides of the connector to bear against the concrete $A^5$ or on the upper faces of the roof plates $B^2$ $B^2$ and prevent any downward movement of the vehicle from thrusting the connector into the conduit to an abnormal extent.

F F are a pair of upright stems mounted upon the vehicle as hereinafter described, and each provided with a roller F' adapted to bear against the upper face of the flat cover bar D. The stems are located in front and rear of the connector, and preferably several feet apart. They serve to insure the return of the cover bar to its supporting ledges as the vehicle passes onward.

In order to counteract any tendency which the rollers E' and F' may have to drag the cover bar longitudinally in the direction of the vehicle's travel, that is, to make it "creep," I provide the cover bar with an additional bearing roller moving with the vehicle, and rotated by suitable gearing in such a direction and at such a speed as to counterbalance the "creeping" or even to tend slightly to push the cover bar in the opposite direction to that in which the vehicle may be traveling. Such a roller as $E^3$ may be conveniently mounted on the connector E, and its shaft $e$ may be provided with a small pinion $E^4$ working in a circular rack $E^5$ on the interior of one of the bearing wheels $E^2$.

To still further insure the flat cover bar always returning to the same place after being raised, I may provide it, on its under side, as shown in Figs. 10 and 11, with pyramidal or conical recesses $d^2$, fitting on to corresponding projections $b^4$ on its supporting ledges $b^2$, but in order to avoid dangerous projections which might catch against the passing connector, and also necessitate the cover bar being raised higher or the size of the connector arms being diminished, I place the projections in the conduit slot in such a manner that they do not contract the opening more than the ledges, and the cover is recessed to fit upon them without any projections being to said cover. Or the recesses may be on the ledges and the projections on the cover bar. The tapering projections, engaging with the tapering recesses, guide the cover bar into its normal position. In Fig. 12, a slight modification is shown, in which the projections and recesses are formed by serrating or corrugating the under side of the flat cover bar near both edges, as at $d^3$, and also the adjacent faces of the supporting ledges $b^2$, as at $b^5$.

As seen in Fig. 2, the cover bar D is very little narrower than the opposing faces of the upper ribs $b^6$ of the roof plates, so that, when the cover bar is bedded down with its upper surface about level with that of the said ribs, it is very difficult to lift it from its seat for the purpose of tampering with it or the conduit, or with any of the parts contained therein. It is, however, very easily lifted when once raised slightly from its seat (as it is near the connector) by thrusting a bar below it. Or it may be raised by getting underneath it at handholes, provided at suitable points along the line.

Figs. 13 to 18 illustrate the manner of manipulating the flat cover bar at the turn-outs and crossings of the conduit, Figs. 13 to 16 showing how the invention is applied in the case of an ordinary "turn out," and Figs. 17 and 18 showing its application to a crossing, all other points or crossings being modifications or combinations of these two types.

In Fig. 13, A A are the track rails arranged as in an ordinary "turn out," the arrows $a$ showing the direction of travel of the "down" vehicles and the arrows $a'$ that of the "up" vehicles. The conduit of the "turn out" opens out from the main conduit in the well known manner. $B^2$ $B^2$ are the roof plates of the conduits and D D' $D^2$ the cover bar supported thereon. The cover bar D of the "turn out" conduit and the part D' of the main line cover bar converge and are stopped off short, as at $d^4$, at or near the point at which the inner edges of the cover bars intersect. The part $D^2$ of the main line cover bar terminates, as at $d^5$, at some distance from the ends of cover bars D D', preferably at or near the point of intersection of the center lines of the cover bars. The intervening space between the cover bars D D' and $D^2$ is filled up with a short junction cover bar $D^3$ which is hinged at $d^6$ to the cover bar $D^2$, so as to be capable of turning in a horizontal plane, and at its opposite end it is provided with a tongue piece $d^7$, Fig. 16, adapted to fit into a groove $d^8$ in the adjacent end of either the cover bar D or D', according to the position of the junction cover bar. In the normal position of the "points," the junction cover bar $D^3$ lies as shown in Fig. 13, so that, as a vehicle comes along the down line, as shown by arrows $a$, the connector picks up the cover bars $D^2$ $D^3$ and D in succession and passes freely into the "turn out" portion of the conduit.

In order to draw over the junction cover bar $D^3$ and place it in alignment with the up line cover bar D', there may be employed any suitable arrangement adapted to be operated by some part moving with the advancing vehicle, before the connector and forward bearing roller thereon have reached the junction cover bar $D^3$. To this end, the said cover bar may be conveniently operated by one of the fore car wheels as follows:—The junction cover bar $D^3$ is supported at or near its free end by a short, strong frame G. The upper end G' on one side of the frame has a cross section similar to the body portions of the roof plates $B^2$, the latter being cut away, where necessary, to permit of the end G' fitting into and rising up on the side of the cover bar. The frame passes down the sides of the conduit and below the conductor, both it and the conduit being of such a size that the frame may be moved upon a guide bed $G^2$ transversely to the conduit the required distance without coming into contact with the conductor H.

J is a rail or fence let into the inside of one of the track rails A and projecting a short distance above the tread of the rail at its forward curved end J'. The fence is so shaped and located that, as the "up" vehicle advances, the flange of one of the fore wheels thereof comes in contact with the fence and thrusts it aside before the connector and forward bearing roller have reached the end of the cover-bar D', holding it back until the connector has reached the cover-bar $D^2$ as hereinafter described. The fence is mounted upon a pair of vertical arms $J^2 J^2$ attached to a horizontal oscillatory shaft $J^3$ below the roadway. The said shaft carries a depending arm $J^4$ which is connected by a link $J^5$ with the frame G in such manner that, each time the fence is thrust back by the vehicle wheel, the frame and junction cover-bar are drawn over and the tongue $d^7$ of the latter passes out of the groove in the end of the cover-bar D and into that in the end of the cover-bar D'. The cover-bars D', $D^3$ and $D^2$ now form a continuous cover rail along which the connector may pass unimpeded. After the connector has passed the junction cover-bar and the vehicle wheel has released the fence J, the latter, with the frame G and cover-bar $D^3$ are all returned to their normal positions by a strong spring $J^6$.

K is a loose plate or flap, which serves to fill up the gap left at the side of the junction cover-bar $D^3$ when the latter is in its normal position and also to guide the passing connection along the turn-out. The plate is supported at its outer edge and at its broad end by the adjacent roof plates $B^2$, which, if necessary, may be cut away or bent aside to some extent to receive it. It is loosely attached to the frame G by two small pins fixed in the upper end of the frame, and fitting loosely into holes K' in the plate K. The plate may also rest upon the end of the frame G. The outer edge of the plate is beveled off as shown at $k$, so that, as the junction cover-bar $D^3$ is drawn over as before described, the plate rides upward over the edge of the roof plate, falling into position again on the return of the cover-bar. It will be understood that the opposite end of the turn out is provided with a similar arrangement of conduit cover-bar switch.

It should be understood that the frame G and guide bed beneath it only extend along the small portion of the junction cover bar between the dotted lines, shown at G', Fig. 13. It is used only to move the junction cover bar and support the loose plate K. This plate, which is also supported by the roof plates, itself supports that edge of the junction cover bar along which it extends by means of a small ledge, as seen in Fig. 14, of similar section to that of the roof plates. The movement of the junction cover bar by the frame G, is effected through the upper end of the frame rising up on one side of the cover bar flush with the surface, and the pins at K' holding in position the plate K which faces along the edge of the cover bar on the other side.

Figs. 17 and 18 show the arrangement of the conduits and cover bars at a crossing. L is a circular plate, which is mounted upon a frame L', similar to the frame G aforesaid, and standing transversely within the conduits at the intersection thereof. The center of the plate is formed with a gap $L^2$ through which the connector may pass, the edges of the gap being so shaped as to form a continuation of the roof plates at each end of it. $D^4$ is a short cover-bar section filling in the gap $L^2$ and supported upon the ledges at each side thereof. The ends of the section $D^4$ are provided with tongue pieces $d^7$ adapted to fit into grooves $d^8$ in the converging ends of the cover-bars D D', which all bear against the circular plate. The frame L' is mounted upon a pivot $L^3$ in such a manner that it is capable of being oscillated about a vertical axis in order to place the cover-bar section $D^4$ in alignment with the main cover-bars of either of the intersecting conduits. The movement of the frame L' in either direction may be effected in a similar manner to that of the frame G as described with reference to Figs. 13, 14 and 15, the frame L' being attached to the reciprocating rod $J^5$ but its center pin $L^3$ is fixed at right angles to the rod in order to give the frame an oscillating movement. Thus, in Fig. 17, supposing the fence J of Fig. 13 were fixed to the rails laid parallel to the cover bars D D, the rod $J^5$ would then work in a line parallel with the dotted line $x\ x$ but would be attached to the frame L' at a point below one of the tongues marked $d^7$, thereby giving the frame a tangential thrust or pull. It will be seen that, according to the position of the plate L and frame L', the cover-bar section $D^4$ forms, with the cover-bars D D or D' D', a continuous cover rail for the conduit of the track along which the vehicle is advancing, so that the cover-bar is readily picked up, by the connector at the crossing and again returned to its seat. $L^4 L^4$ are plates covering the chamber formed in the roadway at the intersection of the conduits. The plates are grooved on their inner edges in a similar manner to the cover-bars D and D', and the plate L is provided with peripheral tongues $L^5$ forming continuations of the tongues $d^7$ of the cover-bar section $D^4$. By this arrangement, the latter tongues are always guided into the grooves, and the loose ends of the main cover-bars are held down securely in position.

The conduit is preferably constructed in the center of the permanent way, as in Fig. 1. Or it may be placed on either side of the permanent way, or directly alongside one of the track rails A, which thus forms one side of the conduit, as seen in Fig. 19.

The connector E aforesaid is attached to a stiff base M, which is detachably mounted upon a larger bed M' carried by a strong framework $M^2$ attached to the body or under frame of the vehicle. The bed M' is provided on its upper side with two or more upright stems $M^3$ which pass through and work within bearings $m$ in the framework $M^2$, and are provided with springs $m'$ inserted between the upper side of the framework and pins or collars $m^2$ on the upper ends of the stems. The springs $m'$ serve to carry the weight of the connector mechanism and cover-bar D, so that variations in the height of the vehicle from the ground or irregularities in the track have a minimum effect upon the position of the connector in the conduit. The base M is so mounted upon the bed M,' that, although held more or less rigidly in its upright position, so that it moves along steadily with the vehicle, it is yet capable of becoming detached from the vehicle should any abnormal strain be put upon it, as, for instance, in case of a fouling of the connector at the points or crossings of the conduit, a derailment of the vehicle, or other serious accident. To this end, the base may be retained in position at its front and rear ends by clamps $M^4$ which are pivoted to the bed M' as at $m^3$ and project through the same, as shown. The clamps are held normally in their upright position by springs $m^4$ which press upon the flat heads $m^5$ of the clamps, and are of such a strength that they will only yield when an abnormal strain is put upon the connector in a fore and aft direction. The base M bears against the bed M', and the connector is held fairly in line with the conduit by flanges $M^5$ which depend from the bed M' past the sides of the base M and are provided with toe pieces $m^6$ which project a short distance below and bear against the under side of the base, so as to uphold the latter against the bed. In order to permit of the connector becoming detached should any abnormal lateral displacement of the vehicle occur, the flanges $M^5$ are pivoted to the bed M', as at $m^7$, and provided with strong springs $m^8$ in a precisely similar manner to the clamps $M^4$. The flanges form, in fact, spring clamps for the sides of the base M. The base is allowed a small amount of lateral play as at $m^9$, so that the connector may accommodate itself to any slight irregularities in the conduit or track rails. As the base M has a broad bearing upon the upper bed M', the connector is held by the clamps in a sufficiently rigid manner to take the points at the crossings or junctions of the conduit, and is also prevented from rocking or tilting up when it is detached from the clamps as hereinbefore described.

The upright stems F F slide within bearings $f$ on strong frames $F^2$ mounted on the body or under frame of the vehicle. A spring $F^3$ surrounds each stem and bears against the under side of the bearing in such manner that the bearing roller F' is always held in contact with the cover-bar, despite the rise and fall of the vehicle. The bearing $f$ is cut away as at $f'$ on the side facing toward the adjacent end of the vehicle, and the stem F is reduced in diameter below the bearing $f^2$, as shown, to such a size as to pass freely through the gap $f'$. In the event of an accident, as above described, the connector E and base M remain in their upright position upon the track, the cover-bar being raised above the level of the latter, as shown. The onward movement of the vehicle causes the rearward stem F to be pushed upward within its bearing, as the roller F' rolls up the elevated cover-bar, so that, by the time the stem has come into contact with the connector base M, the reduced portion of the stem is lying within the bearing and such contact easily thrusts the stem out of the bearing through the gap $f'$, the stem being thus prevented from injuring the connector in front of it.

I employ stiff rubber or flexible metallic or other sheeting N, Figs. 7 and 20, traveling with the vehicle in front of the connector and preferably supported upon and surrounding the bearing stems F. The lower edges of the sheets bear upon the road-way and act as squeegees for cleaning away mud, &c., from the path of the advancing connector, and preventing it from obtaining access to the conduit through the gap caused by the elevated cover-bar. I further use canvas or other sheeting N' hung at each side of the connector and gap aforesaid to prevent any sparks which may occur from becoming visible and thus frightening animals.

The insulators P P, Figs. 1, 2, 4 and 21 are fixed in any convenient manner upon the tie-rods $A^4$. They are preferably of a saddle-like form, as shown in Fig. 21, adapted to be dropped into place upon the tie-rods. The shape of the latter is, if necessary, modified to suit the shape and desired position of the insulators, but otherwise the tie-rods are not cut or disturbed from their ordinary positions. Each insulator is provided, on its upper side, with a groove or recess $p$ to receive the power conductor H, which is located above the tie-rods directly below the cover-bar D and as close as practicable to the latter.

In cases where chairs $B^4$ are employed, as in Fig. 4, the insulators P may be supported upon the webs $B^5$ thereof, as shown. Or, when tie-rods or the like are not employed, the insulators may be fixed into recesses in the sides of the conduit or otherwise, the conductor being supported therefrom, in such manner as not to assist the accumulation of dirt in the conduit or prevent the proper cleansing of the same.

The conductors H are constructed of iron, copper or any suitable low resistance metal or alloy, and of any suitable shape in cross section. Where applicable, I prefer to use a thin flat solid flexible tape H*, Fig. 21ª, or a stranded cable H, (Figs. 2, 22, 23, &c.,) as these, being flexible, are more convenient for carriage and laying, and they can be employed in long lengths without joints. On short branch lines, or in any cases where working and main conductors need not be used, a stranded conductor may be mounted in any convenient manner upon or within the insulators P P. To prevent the wearing of the strands, however, I prefer to support the cable by shorter lengths of stiff bars H' H' of any suitable section mounted upon the insulators in electric contact with the conductor, the said bars and the contact devices of the connector being so arranged that the latter rub upon the bars instead of upon the conductor proper. I prefer to make the bars H' (which may be of any hard metal, such as iron, steel or an aluminium alloy) of an inverted trough or U-section, as shown, and of such a depth and thickness as to impart the necessary rigidity to the conductor. The bars fit within the recesses in the insulators and form a rigid casing within which the cable is hung or supported at points intermediate to the insulators by means of straps $h$ or pins $h'$, as seen in Figs. 22 and 23. The entire conductor is thus rendered as rigid as the solid bar construction, while great facilities are offered for expansion, as the flexibility of the stranded portion H permits it to expand freely and the various sections of the rigid portion H' are placed a short distance apart, the joints being conveniently made at the insulators, as in Fig. 26. The stranded conductor might be incased in stiff pipes or in a flexible armored covering to prevent wear, but the inverted open trough-shape is preferable, as it presents a flat upper surface to the contacts of the connector, and also permits of the conductor being laid before being covered, the conductor merely fitting loosely within the troughs and being supported therein as before described.

It will be noted that a conductor, constructed as above described, presents a flat working surface to the contacts on its upper side through the entire conductor system. This arrangement is of great advantage at the branchings and crossings of the conductor, as it thereby avoids the necessity of switches or other complications at these points, such as are to be found in many systems having a bare conductor laid in an undeground conduit.

Preferably (as is usual) the working supply conductors are divided into sections, each tapped on to a supply main, and in such case I use the constructions of conductors before described and shown in Figs. 2 and 21ª, but I insulate the cable or tape core from the troughing or covering H', as seen at H² in Figs. 21ª, 26 and 27. The covering H' I divide into working line sections $h\ h$, to each of which a conductor $h'$, tapped onto the core H or H*, (which is employed as the main lead) is joined, after passing through the necessary switch or automatic safety arrangements. Both the conductors H* or H and H' are supported in proximity to each other upon the same insulators P P preferably as before described. The lead being supported on the insulators and thus insulated from the earth, a rough insulating covering of fair mechanical strength is quite sufficient to separate the main from the outer working conductor, there being rarely any electrical strain between them except in case of accident, and then only on a short length for a limited time. By these means, I obtain good insulation for the main lead, and this without a costly insulating covering, and I also obtain a main lead well laid and protected, without having to make an enlarged or a separate conduit for it.

It will be obvious that the conduit shown may be altered or enlarged to carry two separately mounted conductors H³ H⁴, as in Fig. 28, this being the arrangement I prefer. The conductors are insulated from each other, one acting as lead and the other as return circuit, in the manner adopted to avoid disturbance of neighboring telephone or other electric circuits, but they may be electrically connected as duplicate conductors (both having the same polarity). In such cases, or where only one main conductor is used, I make the return circuit through the wheels, track rails and earth.

Where I employ two insulated conductors, as lead and return—each being constructed with an outer sheathing and internal insulated core as before described—in order to obtain continuity of current supply, in case a section of the working conductor or outer sheathing be disconnected, and to afford increased safety to passengers and workmen and economy of power when starting and braking the vehicle, as explained hereinafter, I connect the bed, wheels, ironwork and machinery of each vehicle connected with the conductors, to a central point S in the working circuit of the vehicle. In Fig. 28, the wires S' S² S³, are supposed to connect the bed, wheels and ironwork with the central terminal S. The wires S' and S⁴ connect the connector and bearing stems aforesaid with said terminal, and the vehicle or motor circuit which is represented in the diagram by the coils S⁵ S⁵ is connected to the central terminal S and also to the two main terminals T and T', which are in electric connection, through the wires T² T³, and connector contacts Q Q with their respective conductors H³ H⁴. By using two separate motors, or one motor with a double armature, or double winding and two commutators; or by using one motor with an extra pair of brushes fixed centrally on the commutator, the working circuit is electrically divided into two equal parts, so that the electric potential between either conductor and the central terminal is just one half of the total working difference of potential between the main conductors. When using one motor with an extra pair of brushes the latter are fixed centrally in an electrical sense, upon the commutator, that is in such a position between the brush or brushes of the positive and negative poles, that there is an equal difference of potential on either side. It is thus impossible for any one, in case of an accident or undetected faulty insulation, to get a shock with a greater difference of potential than one half of that in use, as the central terminal, ironwork and machinery (connected by the wires $S'$ $S^2$ $S^3$ $S^4$) are all "earthed" through the wheels and connector, which are respectively in electric connection with the track rails and conduit ironwork. I also connect the conduit ironwork, track-rails, and earth to a central point (S G) in the working circuit of the generating plant, as shown in Fig. 30. This may be done, as on the vehicle, by using two machines in series, double armatures, dividing the commutator, or any known manner of dividing a generating circuit; many of which have already been used or suggested for economizing mains with multiple wire systems of distribution. Supposing Fig. 30 to represent the arrangement with two machines in series: S $G'$ and S $G^2$ would represent the machines, S G the central connection between them, T G and $T'$ G the main terminals. In this latter case, the central vehicle terminal need not be permanently connected to the earth circuit, but only when necessary; and, in some cases, the dividing of the motor circuit may be dispensed with altogether, as all that is required is obtained by the division of the generating plant. The above arrangement of connections in conjunction with proper instruments also provides a ready means of detecting faults in the circuit, as well as of indicating on which side of the central connection they are.

I connect the iron framework of the connector E and stems F through the rollers $E'$ $F'$ to earth, as hereinbefore described, thus "earthing" through the flat cover rail D and conduit ironwork $B^2 B^2$. This latter I "joint" throughout the line, and connect in places to the track rails. By these means—as the roller $E'$, over which the cover rail runs, makes a connection on the under side of the cover rail which is always comparatively clean and free from dirt—I am enabled to improve the connection of the vehicle to earth and decrease the tendency to spark at the wheels. By this arrangement, I also utilize the metal in the conduit to reduce the resistance of the earth or return circuit.

In those places where the inflammable nature of the material on the roadway necessitates extra precaution, I use the inside bearing roller $E'$ as the sole connection to earth, disconnecting the vehicle wheels and frame from the circuit or constructing the wheels of an insulating material, such as paper, &c. By these means the weight of the rails and vehicles is utilized to make a good contact between the conductor and rails; the advantages of an auxiliary ground wire are therefore obtained without the necessity of making a riveted or soldered connection to each rail.

Fig. 29 is a diagram showing how I use the foregoing arrangement of connections within the vehicle to insure the continuity of the electric supply in the event of any one of the sections of the working conductors being, from any cause, cut out of circuit. $H^3 H^4$ are the two main insulated leads and $H^5 H^6 H^{6*}$ the working sections thereof connected to their respective leads by fusible cut-outs $H^7$. A A are the track rails, and B D the conduit ironwork connected through the wheels $E^2$ and connector roller $E'$ and by the wires $S'$ $S^2 S^3 S^4$ to each of the central terminals S of the various vehicle circuits and forming earth returns as before described. $T^2 T^3$ are, as before, the wires connecting the conductors through their working conductor sections $H^5$ $H^6 H^{6*}$ with each of the central vehicle terminals S S through the connector contacts and main vehicle terminals. The working sections $H^5 H^6 H^{6*}$ and the cut-outs $H^7$ of the two conductors are, by preference, so arranged that they break joint as shown. By this means, even if two opposite overlapping sections were cut-out, the vehicle would only have to travel one half the length of a section before reaching a "live" section on one or other of the conductors. Or, if only one conductor is provided with working sections, or (as is generally the case) only one section is cut-out at a time, then the vehicle is (in the event of a cut-out) always in connection with a "live" section on one or other of the conductors. This arrangement is utilized as follows:—In the event of a section $H^6$ being cut out, as at $h^2$, the circuit of a vehicle Z in connection therewith is completed from the opposite "live" section $H^5$, through one half the vehicle working circuit, and through the central terminal S, and the wires $S' S^2 S^3$ and $S^4$ to the "earth" returns A A and B D as shown by the arrows. From this earth connection, the current passes to the other vehicles $Z'$ working on the line and through one half of their working circuits to the opposite conductor $H^4$ from which it started, thus propelling the vehicle Z with one half the full potential until it arrives at a "live" section $H^{6*}$ on the "cut-out" conductor.

Fig. 30 shows how the above described arrangement of connections may be employed for the purpose of utilizing the momentum now lost in braking the vehicles. Within each vehicle, a suitable switch is provided, whereby, when it is desired to brake the vehicle, one of the vehicle main terminals $T'$ is connected (as shown in the right hand side of the figure) to the earth circuit B D instead of the central terminal S being connected thereto. The vehicle motor is thus connected as a dynamo to the earth circuit and has an opposing potential only half of that previously driving it, against which it is able to generate a current, which, traveling along the earth circuit, assists to drive other vehicles on the line by driving a current through one half of their circuits, from their central connections to that conductor on which the vehicle being braked is connected. The motor on the vehicle "braked" is thus acting as a dynamo, obtaining the power from the momentum of the vehicle, or from the power generated by the vehicle descending an incline. The current generated by the motor retards its motion, and the energy of the vehicle is thus given up to it and transformed into electrical energy which is transmitted along the line. By this means its speed can be reduced until the motor is unable to generate a current against the opposing potential, when if it is required to stop, the brake must be applied. The vehicles are preferably arranged so that, when being braked, they are not all connected between the same conductor and the earth circuit, but divided as equally as practicable, some on one side and some on the other. When a central vehicle terminal is not used, but only a simple single motor circuit, if a line section be cut out, continuity of supply can be obtained by connecting the opposite main terminal to the earth circuit as when braking. In all cases when starting the vehicles, in order to supply only part of the ordinary difference of potential until the vehicle has acquired a little speed, the same connections are made as when braking. It is evident that when the generating circuit is also divided and connected to this third conductor, as shown in Fig. 30, continuity of supply, safety, and a low potential for braking and starting the cars can be similarly obtained.

I do not wish to state that the division of the generating or motor circuit is novel; but the arrangement and combination of such, in an electric railway with two main conductors, and an earthed third conductor, (preferably the conduit iron-work itself) is, I believe, both new and useful for the purposes above mentioned.

That part of the connector which travels in contact with the conductor or conductors may be designed in any convenient manner. I prefer, however, to employ two rubbing contacts Q Q, Figs. 7, 25 and 31, on each conductor, the contacts being placed a short distance apart, so as to bridge over any short gap which may occur in the conductor—as, for example, at the adjoining ends of the sections hereinafter described, or at the crossings or branchings of the conductor—and thus prevent the circuit being broken at such points. The contacts Q Q are mounted upon a saddle piece $Q'$ extending along the conduit below the cover-bar D and firmly secured, as at $q$, Figs. 8 and 24, to the lower end of the connector. The saddle piece is provided with a central opening $q'$, Fig. 24, through which the upper part of the bearing roller $E'$ projects to support the cover-bar. It is preferable to mount the contacts in an insulated and flexible manner upon the saddle piece $Q'$, and to this end, they may be attached to insulating blocks $q^2$ each attached at its center to a bent spring $q^3$, Figs. 7 and 25, which is secured at one end, as at $q^4$, to the saddle piece, and, at the other end, is capable of working freely within a lug $q^5$ on the under side of said piece. Each of the contacts is connected through a cut-out $q^{11}$ with a separate insulated cable $q^6$, which is led into the vehicle, and is there connected to an automatic switch $q^9$ or to a fusible cut-out $q^{10}$, Fig. 31, or preferably to both, as shown and as hereinafter described. Each cable may conveniently pass from the top of the contact Q through the insulation block $q^2$, as seen in Fig. 25, to one of the depending arms of the connector, as at $q^7$, thence up the edge of said arm, as shown in Fig. 8, and through the base M and bed $M'$ into the vehicle. The cables $q^6$ may be jointed between the base M and bed $M'$ as at $q^8$, Fig. 8, with any well known and suitable rubbing contact device, which will permit the disengagement of the bed and base, as hereinbefore described, without rupturing the cables. The safety cut-outs or equivalent automatic arrangements $q^{11}$, Fig. 25, I insert into the circuit between each contact piece and the end of the connecting cable; to prevent, as far as possible, any accident to the connector, even within the conduit, or any injury to the connecting cables, causing a section of the line to be cut-out, as I construct these to "blow out" or break the circuit before the line section cut-out is effected.

Fig. 31 shows the arrangement for preventing a cut-out section from becoming a source of danger to an adjoining "live" section. Its object and operation may be explained as follows:—Supposing a vehicle to be just passing from a working conductor section $H^6$, having a bad fault $h^3$, and being already "cut-out" of circuit, to the adjoining section, which, being in order, is in circuit, it is evident, if the two contacts Q Q of the connector were directly connected together, a large current would pass, as shown by the arrows, from the contact on the "live" section to that on the "cut-out," and hence to the fault $h^3$ thereon. This would cause the "live" section $H^{6*}$ to be cut out by its fuse, or automatic arrangement $H^{7*}$. I therefore bring the cables $q^6$ from each contact to fusible cut-outs $q^{10}$ within the vehicle or to an automatic switch therein through the contacts and around the magnet or magnets $q^9$ of which the cables each pass before being joined together. The switch cut-out may be an ordinary magnetic cut-out operating with an excess of current, or it may be any known type of cut-out such as is employed for charging accumulators and operating with a reversal of the current. Or a combination of these devices may be employed. Should an abnormal current attempt to flow from one of the contacts Q Q to the other, the fuses "blow out" and prevent it, or, it is evident, if an ordinary switch cut-out were used, the cables from the switch contacts would be wound round the magnets in opposite directions, thus neutralizing each other under normal conditions. In case, however, of accident, their currents are also opposite, flowing up one and down the other, as shown in Fig. 31, and, their magnetic efforts being united, operate the switch, which could thus be made to disconnect either or both contacts from the vehicle circuit, and from each other at the points $q^{10}$ before the "live" section cut-out $H^{6*}$ can be affected, and render it impossible for any injury to be caused by the contacts Q Q being "earthed" on a faulty conductor section. A single fuse at $q^{10}$ or the beaking of the connection to one contact only, would answer the purpose of saving the adjoining sections, but it is preferable to disconnect both contacts.

I am aware that a chain-like cover, comprising a series of short, rigid, unyielding sections, hinged at their ends, has before been proposed. Such a construction is, however, to be distinguished from the cover herein shown, described and claimed, in that in the said prior construction the raising of the cover does not effect any flexure or any change in form of the bars themselves, such as occurs under the present construction. The use of a series of short rigid bars, hinged together to form a chain-like cover, unduly increases the cost, results in excessive wear at the joints, and is more liable to breakage, and unevenness and uncertainty in action than where a hard and comparatively inelastic continuous bar without hinge joints, is employed. In speaking of a continuous bar I mean, therefore, to exclude a chain-like cover composed of a series of rigid unyielding links or plates hinged together.

I declare what I claim is—

1. In a railway or tramway having a slotted power conduit, a continuous cover for such conduit, consisting of hard bars or rails forming a bridge over the conduit slot, capable of supporting the road traffic and also being of a material capable of flexure, the bars or rails being connected together and adapted, by reason of their flexure, to be raised from the slot, and in rear of the cover-raising devices, to seat themselves, substantially as shown and described.

2. In a railway or tramway having a slotted power conduit, with a continuous hard cover in sections adapted to be raised and lowered for the passage of the traveling connector; a connection or joint for the ends of the sections of said cover, adapted to transmit a lifting strain, whereby a section when raised elevates the adjacent section so as to form in the cover a continuous self-supporting arch, substantially as described.

3. In a railway or tramway having a slotted conduit, a covering device for such conduit consisting of a series of long hard bars or rails, the ends of which are tongued and overlap one another in the manner shown in Fig. 3, and provided with countersunk screws $d$, and holes for the reception of such screws, but of a larger extent from front to back than the diameter of the screws, substantially as shown.

4. In an electric railway or tramway, the combination with a slotted power conduit, of a covering device substantially such as described and shown, and mechanism for raising said covering device from its seat during the passage of the vehicle connector, substantially as described.

5. In a slotted power conduit for a railway or tramway, the combination with a continuous hard cover divided into sections or bars, of upright tapering projections fixed on each side of the conduit slot and projecting into corresponding recesses in the individual sections or bars of the cover substantially as described.

6. In an electric railway or tramway having transverse gage or tie rods, as $A^4$, a power conduit constructed to be laid without cutting or disturbing such tie rods, in combination with a suitable insulator, as P, whereby the said gage or tie rods pass undisturbed through the conduit and are utilized for supporting the insulators and conductor substantially as described.

7. In a power conduit for an electric railway or tramway, the combination, with a narrow fixed support running transversely through the conduit, of a narrow saddle-shaped insulator P, adapted to be introduced through the conduit opening and dropped into position upon the support, and having its upper side formed to receive the conductor, substantially as described.

8. In a power conduit for an electric railway or tramway, the combination of the rigid chair $B^4$, the rail tie rod $A^4$ running through the same, and fastening devices $A^7$, serving to clamp the chair securely in position on the tie rod, substantially as and for the purpose described.

9. In a railway or tramway, the combination, with a power conduit turning out or branching at an angle as described, of cover bars closing the openings in said conduit and branches, as described, and a junction cover bar pivoted at one end to the main cover bar at or about the point of intersection of the branches and adapted to be placed in alignment and connected at its opposite end with either of the branch cover bars, substantially as described.

10. In a railway or tramway, the combination, with a power conduit turning out or branching at an angle as described, of the cover bars D D' $D^2$, the junction cover-bar $D^3$ pivoted at one end to the end of the cover-bar $D^2$ at or about the point of intersection of the conduit and branches and extending along the conduit opening to the ends of the converging cover bars D D', a tongue and groove device adapted to connect the end of the junction bar D³ to the adjacent end of the bar D or D', as required, and a shifting device adapted to place the junction cover-bar in alignment with either the cover-bar D or D', substantially as described.

11. The combination with the cover bars D D' D², of the junction cover bar D³ pivoted to cover bar D² and adapted to be connected by a tongue and groove device to the cover bars D D'; the frame G supporting the free end of said junction cover bar at its edges; a shifting device actuated by the advancing car and operating to draw over the cover-bar into alignment with the cover bar D'; and a retracting device to return the junction cover bar after the passage of the car to its normal position in alignment with the cover bar D, substantially as described.

12. In a railway or tramway, the combination, with the power conduit turning out or branching at an angle as described, of the cover bars D D' D², the swiveling junction cover bar D³, the reciprocating supporting frame G located transversely in the conduit junction below the free end of the junction cover bar, the rail fence J adapted to be pushed aside by the wheel of an advancing vehicle and to be held over as described, mechanism transmitting the movement of the fence to the frame as described, and a retracting spring J⁶ adapted to return the various parts to their normal positions after the passage of the vehicle, substantially as described.

13. The combination, with the cover bars D D' D², of the swiveling junction cover bar D³, the supporting frame G located and operated as described, and the loose plate K filling in the gap formed at the junction of the conduit openings and adapted to be moved aside by the movement of the junction cover bar, substantially as described.

14. In a railway or tramway, the combination, with a power conduit crossing or two intersecting power conduits, of the interrupted cover bars D D' closing the conduit openings as described, and a short cover bar section D⁴ swiveling about a vertical axis at the point of intersection of the cover bars and adapted to be placed in alignment and connected at its ends with the two portions of either of said cover bars, substantially as described.

15. In a railway or tramway, the combination, with a power conduit crossing or two intersecting power conduits, of the interrupted cover bars D D', the cover bar section D⁴ having tongues at each end adapted to fit into grooves in the adjacent ends of the cover bars D D', the frame L' swiveling about a vertical axis at the point of intersection of the conduits, the divided plate L carried by said frame and supporting the cover bar section at its edges as described, and mechanism for oscillating the frame about its axis as required, substantially as described.

16. In a railway or tramway, the combination, with a power conduit crossing or two intersecting power conduits, of the interrupted cover bars D D' grooved at their converging ends, the tongued cover bar section D⁴, the swiveling frame L', the divided circular plate L supporting the cover bar section and having peripheral tongues forming continuations of the tongues of the cover bar section, the closure plates L⁴ having grooves forming continuations of those in the cover bars D D', and mechanism for oscillating said frame as required, substantially as described.

17. In an electric railway or tramway, the combination, with a power conduit, of the connector E, base M, bed M', clamping devices connecting said base and bed, framework M² carried by vehicle, vertical stems M³ working in bearings in said framework, and springs $m'$ surrounding said stems and supporting the weight of the bed, base and connector, substantially as described.

18. In an electric railway or tramway, the combination, with a power conduit, and a connector projecting therein from the vehicle, of the broad inverted base M rigidly attached to the connector, bed M' bearing against the upper side of the base, spring clamps M⁴ M⁵ preventing undue horizontal movement in the base under ordinary conditions, and supporting toes $m^6$ and guiding flanges on the side clamps M⁵, substantially as described.

19. The conduit B, the vehicle connector E, and the cover rail D passing upward over the end of the connector as described, in combination with the bearing roller F', stem F having reduced part $f^2$, spring F³, and stem supporting frame F² having bearing $f$ with gap $f'$ at its rear side of a width sufficient to permit the lateral exit of the stem from the bearing when the said reduced part has been thrust upward into it, substantially as and for the purpose described.

20. In combination with the power conduit, the conductor therein, and cover rail covering the conduit opening as described, the connector E, saddle piece Q', insulated contacts Q, contact supporting springs $q^3$, insulated leads $q^6$ and roller E' projecting through the saddle piece and bearing against the under surface of the cover rail, substantially as described.

21. In an electric railway or tramway of the kind described, the combination, with a continuous insulated conductor forming the main lead of the supply circuit, of an interrupted series of bare working conductor sections laid in contact with, but insulated from, and each tapped on to the main insulated lead, and a series of insulators supporting and common to both the main and working lines, substantially as and for the purposes described.

22. In an electric railway or tramway of the kind described, the combination of the insulated cable H H² forming the main lead, the sections of inverted troughing H' laid upon but insulated from the insulated cable and forming a bare rigid sectional line upon which the vehicle contacts may work, a series of conductors $h'$ tapping said sections on to the cable, and a series of insulators P supporting the troughing and its inclosed cable, substantially as described.

23. The combination of the electric power conduit B having its ironwork $B^2$ jointed throughout, of the cover rail D in electric contact with said ironwork, the connector E electrically connected with the return conductor of the vehicle motor circuit, and the connector roller $E'$ bearing on the under side of said cover rail and connected electrically with the connector, substantially as and for the purpose described.

24. In an electric railway or tramway, the combination of the conductors $H^3 H^4$, the lines $T^2 T^3$ connecting the same with their respective vehicle main terminals T and T', the terminal S situated in an electrical sense centrally to the terminals T and T', and the lines $S' S^2 S^3$ and $S^4$ connecting the terminal S and vehicle metal-work with earth, substantially as and for the purposes described.

25. In an electric railway or tramway, the combination of the two main conductors, $H^3 H^4$, serving as lead and return as described, the vehicle motor circuit having its main terminals normally connected with said conductors and its central terminal connected as described with the earth return circuit, and a switch device for breaking the connection between one of said main terminals and its conductor and between the earth return and the central terminal and for simultaneously connecting the earth return with said disconnected main terminal, whereby the vehicle motor is converted into a dynamo to generate an opposing current in the earth circuit operating to brake the car, substantially as described.

26. In an electric railway or tramway, having two main conductors insulated from the earth and serving as lead and return, the combination of the conduit iron work and track rails as a third earthed conductor, and the vehicle motor circuits in connection therewith, substantially as and for the purposes described.

27. In an electric railway or tramway, the combination of the two main conductors, the vehicle motor circuits divided into two electrically equal portions connected to central terminals and to the main conductors as described, and a third conductor connected along the line to the vehicle central terminals and at the end to a similar central terminal in the dynamo or generating circuit, and forming a separate lead for the vehicle motor circuit, substantially as and for the purposes described.

28. In an electric tramway or railway, the combination of the two main conductors, the vehicle motor circuit divided into two electrically equal portions connected to a central terminal and to the main conductors as described, a third conductor connecting the vehicle central terminal with a similar central terminal in the dynamo or generating circuit, and a switch device for disconnecting said central terminal and one of the main terminals as described and connecting the said main terminal with the earth return, substantially as described.

29. In an electric railway or tramway, the combination, with an interrupted series of working conductor sections each tapped on to the main lead as described, of a pair of insulated contacts Q Q located at a suitable distance apart as described and bearing on said sections, insulated cables $q^6 q^6$ connecting said contacts with the same point on the vehicle motor circuit, and one or more cut-out devices connected with said cables and adapted to disconnect them from each other and either or both from the motor circuit should an abnormal current be passed through either of them, substantially as and for the purpose described.

30. In an electric railway or tramway, the combination, with the working conductor sections $H^6$, of the insulated contacts Q Q bearing thereon, the insulated connecting cables $q^6 q^6$, and the fusible cut-outs $q^{10} q^{10}$ located one on each cable above the conduit ironwork, substantially as and for the purpose described.

31. In an electric railway or tramway, the combination, with insulated contacts Q Q bearing thereon, and insulated connecting cables $q^6 q^6$, of the fusible cut-outs $q^{11} q^{11}$ located in close proximity to the contacts Q Q within the conduit, substantially as and for the purpose described.

In testimony whereof I have signed my name to this specification in the presence of two subscribing witnesses.

CARL. T. BLANCH BRAIN.

Witnesses:
JOHN HAYES,
CHARLES LESLIE.